United States Patent Office 3,360,550
Patented Dec. 26, 1967

3,360,550
BETAINES
Frank M. Cowen, North Plainfield, N.J., and Gloria Bellis, New Rochelle, N.Y., assignors to American Cyanamid Company, New York, N.Y., a corporation of Maine
No Drawing. Original application Dec. 28, 1959, Ser. No. 862,087, now Patent No. 3,225,074, dated Dec. 21, 1965. Divided and this application Sept. 1, 1964, Ser. No. 398,143
3 Claims. (Cl. 260—501.13)

This application is a division of application Ser. No. 862,087, filed Dec. 28, 1959, now Patent No. 3,225,074, which in turn is a continuation-in-part of application Ser. No. 547,845 filed Nov. 18, 1955, now abandoned.

The present invention relates to new compositions of matter consisting of betaine derivatives, to the processes of preparing them and to their use as germicides.

It has been found that betaine derivatives may be prepared having the following structural formula:

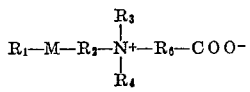

wherein $R_1$ represents long chain aliphatic hydrocarbon radical containing from 10–20 carbon atoms, cycloalkyl, aryl, aralkyl, or alkaryl radicals; M represents a bivalent radical such as —C(=A)—D—, —B—C(=)— or —B—C(=A)—D— in which C is carbon and A, B and D are oxygen, sulfur and imino; $R_2$ is an alkylene radical (—$C_mH_{2m}$—) containing from 1 to 24 carbon atoms and preferably 1–12 carbon atoms; $R_3$ and $R_4$ may represent $R_5$—M—$R_2$—, where $R_5$ selected from the group consisting of $R_1$ and short chain aliphatic hydrocarbon radicals, i.e. alkyl and alkenyl, hydroxyalkyl, —$(C_2H_xR'_{4-x}O)_yH$, or —$R_6$—COOMe, wherein $x$ is a whole number from 2 to 4, $y$ is a number from 1 to about 100, $R'$ is methyl, ethyl, tolyl or phenyl, and Me is hydrogen, ammonium or a metal, particularly an alkali metal or an alkaline earth metal; and $R_6$ is an alkylene radical (—$C_mH_{2m}$—) containing from 1 to 12 carbon atoms and preferably 1–6 carbon atoms.

Typical specific illustrative examples of $R_5$ are methyl, ethyl, propyl, isopropyl, butyl sec-butyl, tert-butyl, isobutyl, amyl, tert-amyl, isoamyl, hexyl, heptyl, octyl, nonyl, decyl, hendecyl, dodecyl, tridecyl, hexadecyl, octadecyl, eicosyl, etc.; allyl butanyl, pentenyl, hexenyl, oleyl, linoleyl, linolenyl, etc.; phenyl, phenethyl, tolyl, xylyl, methyl, xylyl, benzyl, naphthyl, naphthyl methyl, etc.; cyclohexyl, cyclopentyl, etc.

The bivalent radical M, represented by the partial formulas —C(=A)—D—, —B—C(=A)— and

—B—C(=A)—D— includes, for example, such groupings as aminocarbonyl —NH—C(=O)—, carbonylamino —C(=O)—NH—, carbonyloxy —C(=O)—O—; aminocarbonylamino —NH—C(=O)—NH—; the corresponding thio-groupings; and the substituted imino derivatives wherein the hydrogen of the imino radical is substituted by alkyl, cycloalkyl, alkenyl, aryl, aralkyl and alkaryl groups.

Representative examples of radicals $R_2$ and $R_6$ are methylene, ethylene, propylene, butylene, pentamethylene, etc., with the range of carbon atoms being from 1 to 24 and from 1 to 12, respectively.

The hydroxyalkyl radical may be illustrated by such examples as hydroxymethyl, hydroxyethyl, hydroxypropyl, etc. Similarly, the —$(C_2H_xR'_{4-x})_yH$ radical may be illustrated by such examples as ethanoxy, diethanoxy, dipropenoxy, triethanoxy, tetraethanoxy, pentaethanoxy, octaethanoxy, octadecaethanoxy, phenylethanoxy, etc. In the herein after described illustrative examples, it is to be noted that ethylene oxide is the most commonly used oxide but such has been the case primarily for illustrative purposes and is not to be construed as limitative of the invention. Consequently, other alkylene oxides such as propylene oxide and isobutylene oxide, as well as styrene oxide may be used.

The radical Me may be hydrogen, ammonium or a metal such as sodium, potassium, magnesium, calcium, etc.

The betaines of the present invention are prepared by initially making intermediate products suitable for conversion to the desired betaines. These intermediate products include, for example, (1) tertiary amines containing amide groupings resulting from the reaction of an acid (including thionic acids) and an aminoalkyl-substituted tertiary amine; (2) tertiary amines containing amide groupings resulting from the reaction of an acid (including thionic acids) and an aminoalkyl-substituted secondary amine, followed by further treatment of the reaction product with an alkylene oxide; (3) tertiary amines containing ester groupings resulting from the reaction of an acid and an alkanolamine containing a tertiary amine grouping; (4) tertiary amines containing amide groupings resulting from the condensation of urea and N-substituted ureas with a diamine containing one tertiary amine grouping, etc.

These tertiary amine-intermediate products are then reacted with an omega-halogen-substituted aliphatic acid, such as α-chloracetic acid, β-chlorproionic acid, γ-chlorbutyric acid, etc., in the presence of an alkaline material, such as an alkali metal or alkaline earth metal hydroxide, to form the desired betaine.

The above compounds and radicals have been cited as illustrative of the materials which can be used in the present invention and it is to be pointed out that such is not to be construed as limitative of the invention, but that corresponding and equivalent compounds and radicals may be used within the spirit of the inventive concept.

The invention will be further illustrated in more specific detail by the following examples. It should be understood, however, that although these examples may describe in more particular detail some of the very specific features of the invention, they are given primarily for purposes of illustration and the invention in its broader aspects is not to be construed as limited thereto.

PREPARATION OF INTERMEDIATE AMIDES

Example 1

N,N-BIS-(OLEYLAMIDOPROPYL)-N-METHYLAMINE

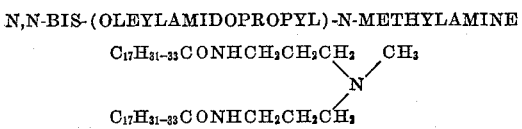

| Reactants | Mole(s) | Gms. |
|---|---|---|
| Acintol Fatty Acid 1 | 1.0 | 294 |
| Bis-(3-aminopropyl)-methylamine | 0.525 | 76 |

The acid (Acintol fatty acid 1 is a fractionated mixture of tall oil fatty acids and contains about 48% oleic acid, 43% linoleic acid and about 3% saturated acids) and the amine were added along with xylene as an entraining agent to a 3-neck flask fitted with a thermometer, stirrer, water trap and reflux condenser. The mixture was heated at reflux for about seven hours at 155–195° C. At the end of this period, the theoretical amount of water (1.0 mole) had collected in the water trap. A sample was titrated and found to contain less than 1% uncombined carboxylic acid. It was therefore stripped free of xylene and unreacted amine and used directly for the preparation of the betaine. Yield, 97%.

Example 2

N,N-BIS-(OLEYLAMIDOPROPYL)-AMINE

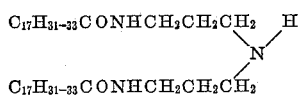

| Reactants | Mole(s) | Gms. |
|---|---|---|
| Actinol FA 1 | 1.5 | 441 |
| Bis-(3-aminopropyl)-amine | 0.788 | 103 |

By the procedure in Example 1, the mixture was heated for 11 hours at 145–195° C. Stripping gave a 98% yield of product.

Example 3

N,N-BIS-(STEARAMIDOPROPYL)-N-METHYLAMINE

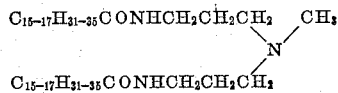

| Reactants | Mole(s) | Gms. |
|---|---|---|
| Hydrofol 405 | 1.0 | 277 |
| Bis-(3-aminopropyl)-methylamine | 0.525 | 76 |

Hydrofol 405 is a commercial grade of "stearic acid" and contains about 65% stearic acid, 28% palmitic acid, 2% myristic acid and 6% oleic acid. After heating for six hours at 152–189° C. and stripping, the product yield was 97%. It set to a hard yellow wax.

Example 4

N,N-BIS-(STEARAMIDOPROPYL)-AMINE

| Reactants | Mole(s) | Gms. |
|---|---|---|
| Hydrofol 405 | 1.3 | 360 |
| Bis-(3-aminopropyl)-amine | 0.683 | 89 |

Heating for ten hours at 183–185° C. and stripping gave a 100% yield of the amide.

A similar preparation in which nitrogen gas was substituted for xylene gave a quantitative yield after sixteen hours at 138–185° C.

Example 5

N,N-BIS-(STEARAMIDOISOPROPYL)-AMINE

| Reactants | Mole(s) | Gms. |
|---|---|---|
| Hydrofol 405 | 1.0 | 277 |
| Dipropylene triamine | 0.5 | 67 |

Employing both nitrogen and xylene, a 96% yield was obtained after twenty-two hours at 147–184° C.

Example 6

N,N-BIS-(STEARAMIDO ETHYL)-AMINE

| Reactants | Mole(s) | Gms. |
|---|---|---|
| Hydrofol 405 | 1.0 | 277 |
| Diethylenetriamine | 0.5 | 57 |

Similar to Example 5 but heated for six hours at 165–173° C. Yield, 98%.

Example 7

N-LAURAMIDOPROPYL-N,N-DIMETHYLAMINE

| Reactants | Mole(s) | Gms. |
|---|---|---|
| Neofat 11 | 1.5 | 310 |
| 3-dimethylaminopropylamine | 1.875 | 191 |

Similar to Example 5 but benzene substituted for xylene and only 25% of amine added at start. Rest added dropwise over a seven hour period. Total heating time was twenty-eight hours at 113–164.5° C. Yield, 98%. (Neofat 11 is a mixture of fatty acids obtained by fractional distillation processes and comprises 90% lauric acid, 9% myristic acid and 1% oleic acid.)

PREPARATION OF INTERMEDIATE ESTERS

Example 8

N-STEAROYLOXYETHYL-N,N-BIS-(2-HYDROXYETHYL)-AMINE

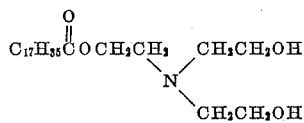

| Reactants | Mole(s) | Gms. |
|---|---|---|
| Hydrofol 405 | 1.0 | 277 |
| Triethanolamine | 1.0 | 147 |

Similar to Example 5 but heated for four hours at 150–195° C. A light tan wax was obtained in a 90% yield.

Example 9

N,N-BIS-(STEAROYLOXYETHYL)-N-(2-HYDROXYETHYL)-AMINE

| Reactants | Mole(s) | Gms. |
|---|---|---|
| Hydrofol 405 | 1.0 | 277 |
| Triethanolamine | 0.5 | 75 |

Heating for eleven hours at 141–190° C. by previous methods gave a tan wax, 96% yield.

Example 10

N,N-BIS-(STEAROYLOXYETHYL)-N-METHYLAMINE

| Reactants | Mole(s) | Gms. |
|---|---|---|
| Hydrofol 405 | 1.0 | 277 |
| Diethanolmethylamine | 0.5 | 61 |

Thirteen hours at 135–160° C. gave a 100% yield of the ester.

PREPARATION OF INTERMEDIATE TERTIARY AMINES (HYDROXYETHYLATION)

Example 11

N,N-BIS-(OLEYLAMIDOPROPYL)-HYDROXYETHYL-AMINE $$C_{17}H_{33}CONHCH_2CH_2CH_2 \diagdown N \diagup CH_2CH_2OH$$
$$C_{17}H_{33}CONHCH_2CH_2CH_2 \diagup$$

| Reactants | Equivalents | Gms. |
|---|---|---|
| N,N-bis-(oleylamidopropyl)-amine (Ex. 2) | 0.4 | 281 |
| Ethylene oxide | | 19 |

The amide was dissolved in 300 g. of isopropyl alcohol and treated with the ethylene oxide for 1.6 hours at 78–81.5° C. Stripping gave the hydroxyethylated product in quantitative yield.

Example 12
N,N-BIS-(STEARAMIDOPROPYL)-HYDROXYETHYL-AMINE

| Reactants | Equivalents | Gms. |
|---|---|---|
| N,N-bis-(stearamidopropyl)-amine (Ex. 4) | 0.65 | 421 |
| Ethylene oxide | | 29 |
| Isopropyl alcohol | | 420 |

As Example 11 except the mixture was treated for two hours at 73–82° C.

Example 13
N,N-BIS-(STEARAMIDOISOPROPYL)-HYDROXYETHYL-AMINE

| Reactants | Equivalents | Gms. |
|---|---|---|
| N,N-bis-(stearamidoisopropyl)-amine (Ex. 5) | 0.5 | 298 |
| Ethylene oxide | | 21.5 |
| Isopropyl alcohol | | 237 |

Treated for 2.3 hours at 50–90° C. Quantitative yield of hydroxyethylated product.

Example 14
N,N-BIS-(STEARAMIDOETHYL)-HYDROXYETHYL-AMINE

| Reactants | Equivalents | Gms. |
|---|---|---|
| N,N-bis-(stearamidoethyl)-amine (Ex. 6) | 0.5 | 298 |
| Ethylene oxide | | 23.5 |
| Isopropyl alcohol | | 237 |

Treated for 2.8 hours at 67–80° C. Quantitative yield.

PREPARATION OF BETAINES

Example 15
N,N-BIS-(OLEYLAMIDOPROPYL)-N-METHYL-N-CARBOXYMETHYLAMMONIUM BETAINE

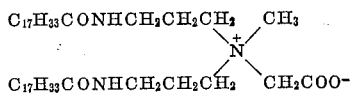

| Reactants | Equivalents | Gms. |
|---|---|---|
| N,N-bis(oleylamidopropyl)-N-methylamine (Ex. 1) | 0.445 | 279. |
| Chloracetic acid | 0.445 | |
| Sodium hydroxide | 0.445 | |
| Ethanol | | 50 ml. |
| Water | | 75 ml. |

The chloracetic acid was suspended in the water in a flask of suitable size equipped with a stirrer, thermometer, and reflux condenser. The acid was neutralized with the sodium hydroxide as a 40–50% aqueous solution while cooled in an ice bath. The amine in alcohol was added and the mixture refluxed for five hours.

At the end of the reaction the mixture was diluted with alcohol and evaporated to dryness. The resulting solid was dissolved in benzene and the insoluble salt (sodium chloride) removed by filtration. The filtrate was evaporated to dryness to give a brown paste in quantitative yield.

The product was useful as a germicide and killed 24-hour cultures of Salmonella typhosa in 10 minutes at 20° C. in dilutions up to 1:1000.

It was also useful as a softening agent for textiles, particularly cottons.

It is to be noted that the $P_1$—M—$R_2$—grouping in Example 15 is, in effect, an alkenylamidoalkyl radical, as compared to an alkylamidoalkyl radical (Example 17), an alkyloxyalkyl radical (Example 21), an alkylcarbamylalkyl radical (Example 23), an alkarylamidoalkyl radical (Example 31), a cycloalkylamidoalkyl radical (Example 33) or the thio-substituted alkylcarbamylaminoalkyl, alkylamidoalkyl and arylamidoalkyl radicals (Examples 34, 35, 36).

Example 16
N,N-BIS-(OLEYLAMIDOPROPYL) - N,N - BIS(CARBOXYMETHYLAMMONIUM) BETAINE, MONOSODIUM SALT

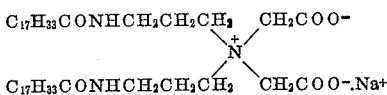

| Reactants | Equivalents | Gms. |
|---|---|---|
| N,N-bis-(oleylamidopropyl)-amine (Ex. 2) | 0.25 | 176. |
| Chloracetic acid | 0.50 | |
| Sodium hydroxide | 0.75 | |
| Ethanol | | 35 ml. |
| Water | | 75 ml. |

Reflux for six hours and workup gave a quantitative yield of viscous brown liquid.

Example 17
N,N-BIS-(STEARAMIDOPROPYL)-N-METHYL-N-CARBOXYMETHYLAMMONIUM BETAINE.

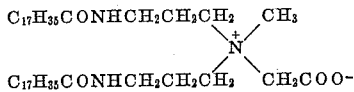

| Reactants | Equivalents | Gms. |
|---|---|---|
| N,N-bis-(stearamidopropyl)-N-methylamine (Ex. 3) | 0.50 | 292. |
| Chloracetic acid | 0.50 | |
| Sodium hydroxide | 0.50 | |
| Ethanol | | 100 ml. |
| Water | | 50 ml. |

A reflux time of five hours and usual work up gave a yellow wax (quantitative).

The product was useful as a cotton softener. It was also useful as a germicide and killed 24-hour cultures of Salmonella typhosa in 10 minutes at 20° C. in dilutions up to 1:1000.

Example 18
N-(STEARAMIDOPROPYL)-N,N-DIMETHYL-N-CARBOXYMETHYLAMMONIUM BETAINE

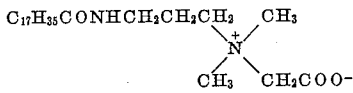

| Reactants | Equivalents | Gms. |
|---|---|---|
| N-(stearamidopropyl)-N,N-dimethyl-amine | 0.50 | 201. |
| Chloracetic acid | 0.50 | |
| Sodium hydroxide | 0.50 | |
| Ethanol | | 150 ml. |
| Water | | 50 ml. |

Five hours refluxing and workup gave a quantitative yield of a white wax. The product was useful as a detergent and as an anti-static agent.

Example 19

N,N - BIS - (OLEYLAMIDOPROPYL) - N - (2 - HYDROXY-ETHYL)-N-CARBOXY-METHYL AMMONIUM BETAINE

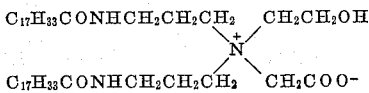

| Reactants | Equivalents | Gms. |
|---|---|---|
| N,N-bis-(oleylamidopropyl)-N-(2-hydroxyethyl)-amine (Ex. 11). | 0.20 | 300 (including isopropyl alcohol). |
| Chloroacetic acid | 0.20 | |
| Sodium hydroxide | 0.20 | |
| Isopropyl alcohol | | 30 ml.+ |
| Water | | 40 ml. |

Refluxing for five and three-quarter hours and recovery gave a viscous sticky brown paste in quantitative yield.

Example 20

N,N - BIS - (STEARAMIDOPROPYL) - N - (2 - HYDROXY-ETHYL)-N-CARBOXYMETHYL AMMONIUM BETAINE

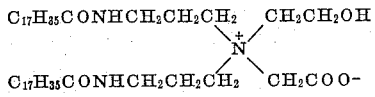

| Reactants | Equivalents | Gms. |
|---|---|---|
| N,N-bis-(stearamidopropyl)-N-(2-hydroxyethyl)-amine (Ex. 12). | 0.65 | 870 (including isopropyl alcohol). |
| Chloroacetic acid | 0.65 | |
| Sodium hydroxide | 0.65 | |
| Isopropyl alcohol | | 100 ml.+ |
| Water | | 130 ml. |

A quantitative yield of tan or brown wax was obtained after about six hours of reflux and recovery.

Example 21

N-STEAROYLOXYETHYL-N,N-BIS-(2-HYDROXYETHYL)-N-CARBOXYMETHYL AMMONIUM BETAINE

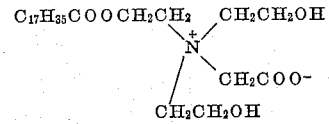

| Reactants | Equivalents | Gms. |
|---|---|---|
| N-stearoyloxyethyl-N,N-bis-(2-hydroxyethyl)-amine (Ex. 8). | 0.286 | 200. |
| Chloroacetic acid | 0.286 | |
| Sodium hydroxide | 0.286 | |
| Ethanol | | 150 ml. |
| Water | | 75 ml. |

The refluxing time was six and three-quarter hours. Quantitative yield of tan wax. The product was useful as a detergent and anti-static agent.

Example 22

N,N - BIS - (STEAROYLOXYETHYL) - N - (2 - HYDROXY-ETHYL)-N-CARBOXYMETHYL AMMONIUM BETAINE

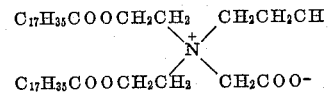

| Reactants | Equivalents | Gms. |
|---|---|---|
| N,N-bis-(stearoyloxyethyl)-N-(2-hydroxyethyl)-amine (Ex. 9). | 0.086 | 200. |
| Chloroacetic acid | 0.086 | |
| Sodium hydroxide | 0.086 | |
| Ethanol | | 150 ml. |
| Water | | 40 ml. |

Six and three-quarter hours reflux gave a 92% yield of tan wax.

Example 23

N,N-BIS - (N' - OCTADECYLCARBAMYLETHYL)-N-(2-HYDROXYETHYL) - N - CARBOXYMETHYL AMMONIUM BETAINE

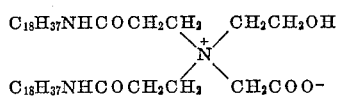

| Reactants | Equivalents | Gms. |
|---|---|---|
| N,N-bis-(N'-octadecylcarbamylethyl)-N-(2-hydroxyethyl)-amine. | 0.071 | 72. |
| Chloroacetic acid | 0.071 | |
| Sodium hydroxide | 0.099 | |
| Ethanol | | 160 ml. |
| Water | | 40 ml. |

A refluxing time of seven hours resulted in the recovery of a quantitative yield of a brown wax. It possessed utility as a textile softener.

Example 24

N,N-BIS-(STEARAMIDOISOPROPYL) - N - (2 - HYDROXY-ETHYL)-N-CARBOXYMETHYL AMMONIUM BETAINE

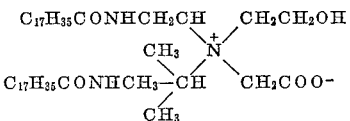

| Reactants | Equivalents | Gms. |
|---|---|---|
| N,N-bis-(stearamidoisopropyl)-N-(2-hydroxyethyl)-amine. | 0.50 | 560 (including isopropyl alcohol). |
| Chloroacetic acid | 0.50 | |
| Sodium hydroxide | .50 | |
| Isopropyl alcohol | | 100 ml.+ |
| Water | | 75 ml. |

Seven hours refluxing gave an orange-brown paste. Recovery was quantitative.

Example 25

N,N-BIS-(STEARAMIDOETHYL)-N-(2-HYDROXYETHYL)-N-CARBOXYMETHYL AMMONIUM BETAINE

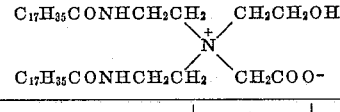

| Reactants | Equivalents | Gms. |
|---|---|---|
| N,N-bis-(stearamidoethyl)-N-(2-hydroxyethyl)-amine. | 0.493 | 555 (including isopropyl alcohol). |
| Chloroacetic acid | 0.493 | |
| Sodium hydroxide | 0.493 | |
| Isopropyl alcohol | | 150 ml. |
| Water | | 150 ml. |

A reflux time of five hours and workup gave a quantitative yield of a tan wax.

Example 26

N,N-BIS-(STEAROYLOXYETHYL)-N-METHYL-N-CARBOXYMETHYLAMMONIUM BETAINE

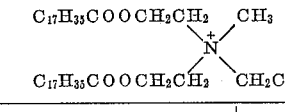

| Reactants | Equivalents | Gms. |
|---|---|---|
| N,N-bis-(stearoyloxyethyl)-N-methylamine. | 0.09 | 307. |
| Chloroacetic acid | 0.09 | |
| Sodium hydroxide | 0.09 | |
| Isopropyl alcohol | | 300 ml. |
| Water | | 50 ml. |

Seven and one-quarter hours was sufficient reflux time to give a 94% recovery of a tan wax product. It was useful as a cotton softener.

Example 27
N-(LAURAMIDOPROPYL)-N,N-DIMETHYL-N-CARBOXYMETHYLAMMONIUM BETAINE

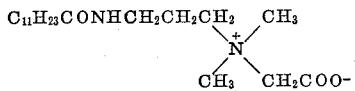

| Reactants | Equivalents | Gms. |
|---|---|---|
| N-(lauramidopropyl)-N,N-dimethylamine. | 1.57 | 426. |
| Chloroacetic acid | 1.73 | |
| Sodium hydroxide | 1.73 | |
| Ethanol | | 175 ml. |
| Water | | 200 ml. |

Heated at reflux for nine and one-half hours; gave quantitative yield of soft tan wax.

Example 28
POLYETHYLENE GLYCOL PRODUCT

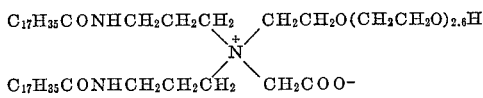

| Reactants | Equivalents | Gms. |
|---|---|---|
| Betaine in Ex. 19 | 0.1 | 88 |
| Ethylene oxide | *0.26 | |
| Isopropyl alcohol | | 111 |

* Actually reacted. Excess used.

The betaine was dissolved in the alcohol, the mixture heated to 20° C. and ethylene oxide added at 62–78° C. for 2⅓ hours. The final product, a polyethenoxy derivative obtained in quantitative yield, was a brown 47% solution.

This material contained 2.6 mols of combined ethylene oxide for each mol of the original betaine. It was therefore a mixture of two or more ethylene oxide condensation products.

Example 29
POLYETHYLENE GLYCOL PRODUCT

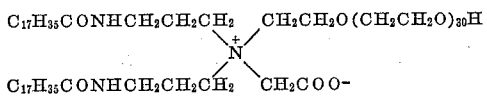

| Reactants | Equivalents | Gms. |
|---|---|---|
| Betaine in Ex. 19 | 0.1 | 88 |
| Ethylene oxide | *3.0 | |
| Isopropyl alcohol | | 111 |

* Actually reacted. Excess used.

The betaine was dissolved in the alcohol, the mixture heated to 20° C. (under 100 p.s.i.) and ethylene oxide added at 62–78° C. for 7 hours. The final product, a polyethenoxy derivative, was obtained in substantially a quantitative yield. It was useful as an emulsifier.

Example 30
N,N-BIS(PROPYLAMIDOPROPYL)-N-METHYLAMINE

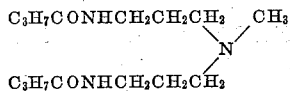

| Reactants | Mole(s) | Gms. |
|---|---|---|
| Propionic acid | 1 | 74 |
| Bis-(3-aminopropyl)-methylamine | 0.525 | 76 |

The procedures set forth in Example 1 were followed substantially as set forth therein. The yield was quantitative.

N,N-BIS(PROPYLAMIDOPROPYL)-N-METHYL-N-CARBOXYMETHYL AMMONIUM BETAINE

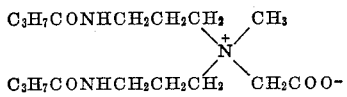

The procedures of Example 15 were followed, using substantially equal molal amounts of amine, chloracetic acid and sodium hydroxide. The yield was quantitative.

Example 31
N,N-BIS(DODECYLBENZYLAMIDOPROPYL)-N-DECYLAMINE

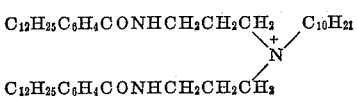

| Reactants | Mole(s) | Gms. |
|---|---|---|
| p-Dodecyl benzoic acid | 1 | 293 |
| Bis-(3-aminopropyl)-decylamine | 0.525 | 184 |

Procedures as in Example 1.

N,N-BIS(DODECYLBENZYLAMIDOPROPYL)-N-DECYL-N-CARBOXYETHYL AMMONIUM BETAINE

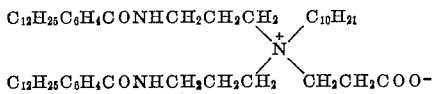

Using chlorpropionic acid and sodium hydroxide, as Example 15.

Example 32
N,N-BIS(CYCLOHEXYLAMIDOPROPYL)-N-OCTYL-N-CARBOXYMETHYL AMMONIUM BETAINE

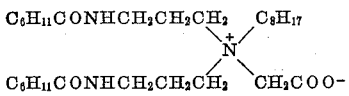

Using cyclohexyl carboxylic acid and bis-(3-aminopropyl)-octylamine to form the intermediate tertiary amine and chloracetic acid and sodium hydroxide to form the betaine.

Example 33

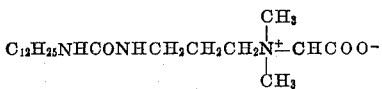

Using N-dodecylurea and 3-aminopropyldimethylamine in the formation of the tertiary amine, followed by its reaction with chloracetic acid and sodium hydroxide in the formation of the betaine.

Example 34

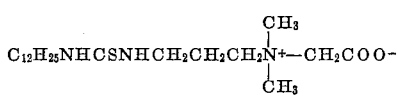

Using N-dodecyl thio-urea and 3-aminopropyldimethylamine in the formation of the tertiary amine, followed by its reaction with chloracetic acid and sodium hydroxide in the formation of the betaine.

Example 35

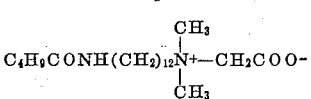

Using butyric acid and dimethylaminolaurylamine to form the tertiary amine and chloracetic acid and sodium hydroxide to form the betaine.

Example 36

$$CH_3\overset{S}{\overset{\|}{C}}-NHCH_2CH_2CH_2\overset{CH_3}{\overset{|}{N^+}}-CH_2CH_2COO^-$$
$$\phantom{CH_3\overset{S}{\overset{\|}{C}}-NHCH_2CH_2CH_2N^+}\underset{|}{\phantom{N}}$$
$$\phantom{CH_3\overset{S}{\overset{\|}{C}}-NHCH_2CH_2CH_2N^+}CH_3$$

Using ethanethionic acid and a slight excess of 3-dimethylaminopropylamine in the formation of the intermediate tertiary amine and chloropropionic acid and sodium hydroxide in the formation of the betaine.

Example 37

$$C_6H_5\overset{S}{\overset{\|}{C}}-NHCH_2CH_2CH_2\overset{C_2H_5}{\overset{|}{N^+}}-CH_2CH_2CH_2COO^-$$
$$\phantom{C_6H_5\overset{S}{\overset{\|}{C}}-NHCH_2CH_2CH_2N^+}C_2H_5$$

Using thiobenzoic acid and a slight excess of 3-diethylaminopropylamine in the formation of the intermediate tertiary amine and chlorobutyric acid in the formation of the betaine.

The products of the present invention were determined to be useful as germicides. One specific evaluation of a particular product is set forth below as illustrative of such utility. The product was N-(lauramidopropyl)-N,N-dimethyl-N-carboxymethylammonium betaine (Example 27) used on a 35% solids basis and the test procedure used was the F.D.A. method described in Circular #198, United States Department of Agriculture. The test organism was a 24-hour culture of *Salmonella typhosa* (Hopkins) and the incubation period was 48 hours at 37° C. The following table indicates the results obtained.

TABLE 1

|  | Evidence of Growth After— | | |
| --- | --- | --- | --- |
|  | 5 mins. | 10 mins. | 15 mins. |
| Concentration of Betaine: |  |  |  |
| 1:800 | − | − | − |
| 1:900 | − | − | − |
| 1:1000 | − | − | − |
| 1:1200 | + | + | + |
| 1:1300 | + | + | + |
| 1:1400 | + | + | + |
| Concentration of Phenol: |  |  |  |
| 1:80 | − | − | − |
| 1:90 | + | + | + |
| 1:100 | + | + | + |

Legend:
+ indicates growth.
− indicates no growth.

As a control and comparison, a similar test procedure was used on a 35% solids solution of stearamidopropyl-dimethyl-B-hydroxyammonium dihydrogen phosphate (SP). This product (SP) is not a product of the present invention but was selected as it bears some structural resemblance to the products of the present invention. The following table indicates the results obtained.

TABLE 2

|  | Evidence of Growth After— | | |
| --- | --- | --- | --- |
|  | 5 mins. | 10 mins. | 15 mins. |
| Concentration of SP: |  |  |  |
| 1:1 | − | − | − |
| 1:50 | + | + | − |
| 1:100 | + | + | + |
| 1:150 | + | + | + |
| 1:200 | + | + | + |
| 1:250 | + | + | + |
| Concentration of Phenol: |  |  |  |
| 1:80 | − | − | − |
| 1:90 | + | + | + |
| 1:100 | + | + | + |

Legend:
+ indicates growth.
− indicates no growth.

The above tables indicate that a 1:1500 dilution of the betaine killed a 24-hour culture of *Salmonella typhosa* in 10 minutes at a temperature of 20° C. This corresponds to a 1:85 dilution of phenol. The phenol coefficient is therefore 18.1. With regard to product SP, the 24-hour culture of *Salmonella typhosa* was killed in 10 minutes at 20° C. with a dilution of 1:25. This corresponds to a 1:85 dilution of phenol. The phenol coefficient is therefore 0.3.

Although we have described specific examples of our inventive concept, we consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

What is claimed is:

1. Betaines having the formula $$R_1NH-\overset{X}{\overset{\|}{C}}-R_2-\overset{R_3}{\overset{|}{N^+}}-R_6-COO^-$$
$$\phantom{R_1NH-\overset{X}{\overset{\|}{C}}-R_2-N^+}R_4$$

where $R_1$ is an aliphatic hydrocarbon radical of from 10 to 20 carbon atoms selected from the group consisting of long chain saturated aliphatic and long chain alkenyl aliphatic radicals, $R_2$ and $R_6$ are alkylene radicals of from 1 to 12 carbon atoms, $R_4$ is a member of the group consisting of $-C_nH_{2n+1}$ in which $n$ is a whole number from 1 to 10 and $-C_nH_{2n}.OH$ in which $n$ is a whole number from 1 to 10 and $-(C_2H_4.O)_xH$ in which $x$ is a whole number from 2 to about 100 and $R_3$ is a member of the group consisting of $R_4$, $$R_1NH\overset{X}{\overset{\|}{C}}-R_2$$

$-R_6-COOH$ and $-R_6COOMe$ in which $R_1$, $R_2$, $R_4$ and $R_6$ are as defined above and Me is a monovalent salt-forming radical, and X is selected from the group consisting of O and S.

2. Betaines having the formula $$R_1NH-\overset{O}{\overset{\|}{C}}-R_2-\overset{R_3}{\overset{|}{N^+}}-R_6-COO^-$$
$$\phantom{R_1NH-\overset{O}{\overset{\|}{C}}-R_2-N^+}R_4$$

where $R_1$ is a long chain saturated aliphatic hydrocarbon radical of from 10 to 20 carbon atoms, $R_2$ and $R_6$ are short chain alkylene radicals, $R_4$ is a member of the group consisting of $-C_nH_{2n}+1$ in which $n$ is a whole number from 1 to 10 and $-C_nH_{2n}.OH$ in which $n$ is a whole number from 1 to 10 and $-(C_2H_4.OH)_xH$ in which $x$ is a whole number from 2 to about 100 and $R_3$ is a member of the group consisting of $R_4$, $$R_1NH-\overset{O}{\overset{\|}{C}}-R_2-$$

$-R_6-COOH$ and $-R_6COOMe$ in which $R_1$, $R_2$, $R_4$ and $R_6$ are as defined above and Me is a monovalent salt-forming radical.

3. N,N - bis - (N' - octadecylcarbamylethyl) - N - (2-hydroxyethyl)-N-carboxymethyl ammonium betaine.

References Cited

UNITED STATES PATENTS 2,777,872  1/1957  Schacklett _____ 260—501
2,935,493  5/1960  Schuller et al. _____ 260—501

LORRAINE A. WEINBERGER, *Primary Examiner.*

CHARLES B. PARKER, *Examiner.*

A. H. SUTTO, M. B. WEBSTER, *Assistant Examiners.*